United States Patent [19]
Lang

[11] 3,712,342
[45] Jan. 23, 1973

[54] DEVICE FOR COMPENSATING FOR THE VARIATIONS OF THE VISCOSITY OF A FLUID IN A HYDRAULIC CIRCUIT DEPENDING ON ITS TEMPERATURE

[75] Inventor: Robert Lang, Claye Souilly, France
[73] Assignee: CIBIE Projecteurs, Bobigny, France
[22] Filed: Feb. 26, 1971
[21] Appl. No.: 119,320

[30] Foreign Application Priority Data

March 10, 1970 France..................................7008523

[52] U.S. Cl. .........................138/46, 236/93, 236/102
[51] Int. Cl. ...............................................G05d 7/01
[58] Field of Search ........138/44, 45, 46; 137/8, 468; 236/102, 93

[56] References Cited

UNITED STATES PATENTS

| | | | |
|---|---|---|---|
| 2,821,268 | 1/1958 | Carbon | 137/468 X |
| 2,872,120 | 2/1959 | Weiland | 236/102 X |
| 2,966,170 | 12/1960 | Raulins | 236/93 X |
| 3,340,893 | 9/1967 | Lockwood | 236/93 X |
| 2,960,109 | 11/1960 | Wilson | 138/46 X |
| 2,830,621 | 4/1958 | Prescott | 138/46 |
| 3,322,345 | 5/1967 | Getz | 138/46 X |

Primary Examiner—William R. Cline
Attorney—Breitenfeld & Levine

[57] ABSTRACT

A compensating device for use in correcting for variations of viscosity in a hydraulic fluid comprising an apertured diaphragm construction of such a nature that the aperture is reduced in area when there is a temperature increase in the hydraulic fluid.

3 Claims, 5 Drawing Figures

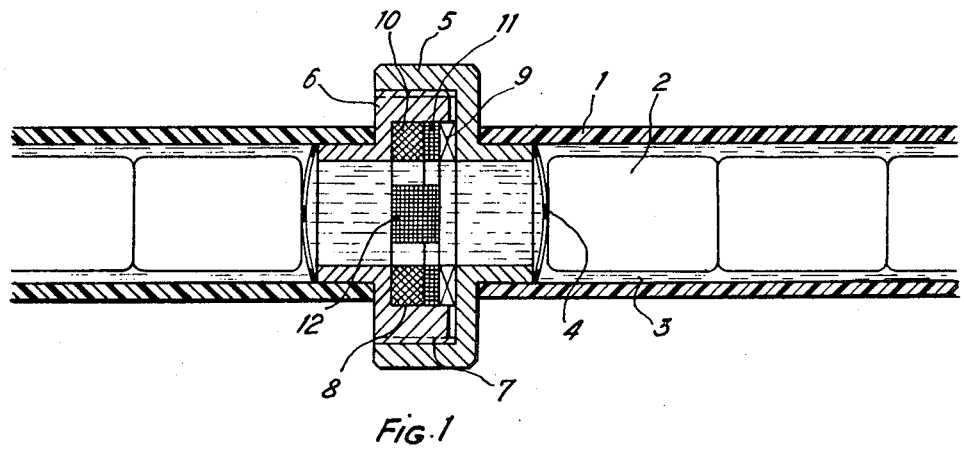
Fig.1
 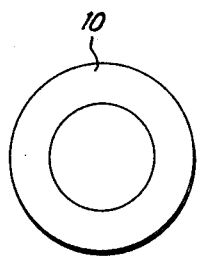
Fig.2a   Fig.2b
 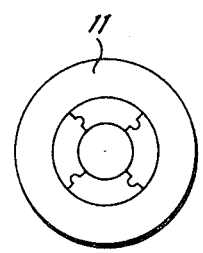
Fig.3a   Fig.3b
INVENTOR:
ROBERT LANG
By
Breitenfeld & Levine
ATTORNEYS

DEVICE FOR COMPENSATING FOR THE VARIATIONS OF THE VISCOSITY OF A FLUID IN A HYDRAULIC CIRCUIT DEPENDING ON ITS TEMPERATURE

The present invention relates to a device for compensating for the variations of the viscosity of a fluid in a hydraulic circuit depending on its temperature.

A flow of a fluid in a hydraulic pipe is often used as a control agent, for example, by means of its pressure or its speed of flow. Variations in the temperature of a fluid have an effect on the parameters of flow and of volume which is a disadvantage for the stability of control related to the variables of the flow.

In known manner, it is possible to correct variations of volume by providing solid bodies inside the pipe along the length thereof so that variations in volume of the fluid and of the pipe provided with these bodies are compensated.

It is an object of the present invention to provide a device intended to reduce the effect of variations of the viscosity, depending on the temperature on the flow of the fluid.

According to the present invention the device is constituted by an apertured diaphragm, the aperture of which is reduced in area when the temperature is increased, which has the effect of reducing the flow section presented for the passage of the fluid. Taking into account the increase in viscosity this diaphragm may be adjusted so as to obtain a substantially constant flow over a given temperature range.

An embodiment of the present invention will now be described, by way of example, with reference to the accompanying drawing, in which:

FIG. 1 is a longitudinal section of a pipe provided with the device according to the present invention;

FIGS. 2a and 2b show respectively a radial section and a front view of a ring with which the device is provided; and FIGS. 3a and 3b show respectively a radial section and a front view of a ring having a cylindrical central part with which the device is provided.

In FIG. 1, the pipe in which the fluid flows comprises a tube 1 of polyamide enclosing ceramic beads or bodies 2, this arrangement having the effect of reducing the influence of variations of volume of the fluid as above-mentioned. The fluid flows in the annular passage 3, free between the tube 1 and the beads 2. Elastic means 4 maintain the ceramic beads 2 in their appropriate position inside the tube 1.

The device according to the invention comprises a socket and spigot 5 and 6, respectively for connecting two parts of the pipe 1 together, the spigot 6 screw-engaging the socket 5 as indicated by the thread 7. The socket 5 and spigot 6 define an inner cylindrical chamber 8 of larger diameter than the pipe 1 and in which are housed a washer 9 of hard rubber or similar material and two rings 10 and 11, the ring 11 being provided with a central stem 12, connected to the ring 11 by flexible webs or attachments 13 shown in the front view of FIG. 3. The washer 9 also serves as a gasket.

The rings 10 and 11 constitute a diaphragm arrangement.

The ring 10, shown in FIGS. 2a and 2b is made of ceramic material which is only slightly expansible and thus defines for the diaphragm the outer contour of the section for the flow, a contour which is independent of the temperature.

The rings 11, shown in FIGS. 3a and 3b is made of polyamide, a material sensitive to changes of temperature. Its external part thus expands when the temperature rises, the outer contour of the section for flow always being defined by the ring 10. Its central part also expands; this central part defining the inner contour of the section of flow, contour whose diameter increases with the temperature.

The diaphragm arrangement of the two rings 10 and 11 thus reduces the section presented for the passage of the fluid when the temperature increases, while the viscosity of the fluid decreases, which makes it possible to keep the variables of flow at substantially constant values.

An interesting application of this device is in the automatic adjustment by hydraulic control of the orientation in height of the headlamp of a motor vehicle.

What is claimed is:

1. A device for use in a hydraulic circuit to compensate for variations in the viscosity of fluid contained in the circuit, comprising:
   a. A spigot adapted to be engageable with the hydraulic circuit;
   b. A socket adapted to be engageable with the hydraulic circuit, said spigot and socket being coupled to each other to provide a chamber through which fluid can pass and which is in series with the hydraulic circuit, said chamber having spaced-apart, opposed walls defined by the spigot and socket, respectively; and
   c. at least one diaphragm in the chamber for the control of fluid flow, said diaphragm including a first ring having a substantially zero thermal coefficient of expansion, a second ring coaxial with and adjacent to the first ring and having a non-zero thermal coefficient of expansion, said second ring having a central part axially extending into the first ring, thereby providing an annular section for through fluid flow, and a sealing washer coaxial with said rings and located between one of the rings and the socket, said rings and washer being pressed together to form the diaphragm by the walls of the chamber.

2. A device according to claim 1, in which the first ring is made of ceramic while the second ring is made of a polyamide.

3. A device according to claim 1, wherein the spigot is threaded, the socket is threaded, and the spigot and socket are coupled by the threads on the spigot and socket.

* * * * *